United States Patent [19]
Detroit

[11] Patent Number: 4,846,888
[45] Date of Patent: Jul. 11, 1989

[54] OIL WELL DRILLING CEMENT DISPERSANT

[75] Inventor: William J. Detroit, Scholfield, Wis.

[73] Assignee: Reed Lignin Inc., Rothschild, Wis.

[21] Appl. No.: 93,398

[22] Filed: Sep. 4, 1987

[51] Int. Cl.$^4$ ............................................. C04B 24/18
[52] U.S. Cl. ...................................... 106/93; 106/90; 106/315; 530/505
[58] Field of Search .......................... 106/93, 90, 315; 530/505

[56] References Cited

U.S. PATENT DOCUMENTS

| | | | |
|---|---|---|---|
| 2,935,473 | 5/1960 | King et al. | 252/8.51 |
| 3,168,511 | 2/1965 | King et al. | 252/8.51 |
| 4,149,900 | 4/1979 | Childs et al. | 106/314 |
| 4,374,738 | 2/1983 | Kelley | 252/8.51 |
| 4,457,853 | 7/1984 | Detroit | 252/8.511 |
| 4,505,825 | 3/1985 | Detroit | 252/8.511 |
| 4,674,574 | 6/1987 | Savoly et al. | 106/90 |

OTHER PUBLICATIONS

Psotta et al., "Lignosulfonate Crosslinking Reactions.1, The Reactions of Lignosulfonate Model Compounds with Diazonium salts", Holzforschung, 37(2), pp. 91–99, 1983, Chem. Abstract CA99(2):7018Q.

Forbes et al., "Lignosulfonate Crosslinking Reactions.2, The Coupling of Lignosulfonate with Diazonium Salts", Holzforschung, 37(2), pp. 101–106, 1983, Chem. Abstract CA98(26):217427c.

Hawley, Gessner, "The Condensed Chemical Dictionary", 8th Edition, p. 516, 1974.

Article entitled "Cementing" by Dwight K. Smith, published in 1976, p. 25.

Primary Examiner—Mark L. Bell
Assistant Examiner—Anthony J. Green
Attorney, Agent, or Firm—Andrus, Sceales, Starke & Sawall

[57] ABSTRACT

An additive for oil well drilling cement is provided by an azo lignosulfonate formed from the coupling of a diazonium salt made from sulfanilic acid or para-aminobenzoic acid and a lignosulfonate to provide an effective cement dispersant with low set time retardation.

7 Claims, No Drawings

OIL WELL DRILLING CEMENT DISPERSANT

BACKGROUND

The present invention relates to oil well drilling cements, and more particularly to an additive for an oil well drilling cement having dispersant effectiveness and low set time retardation.

Oil well drilling cement compositions are typically used for sealing or cementing subterranean zones such as the annular space in an oil well between the surrounding formation and casing. In cementing the annular space of an oil well, a cement slurry is pumped down the inside of the casing back up the outside of the casing through the annular space and then allowed to set.

A satisfactory cementing composition must have various desired functions which contribute to the success of a well drilling cementing operation. In order to accomplish these various functions, it has been found necessary to incorporate certain additives in a cementing composition to obtain a desired set of rheological properties for the cementing composition. For example, high temperatures are frequently encountered in subterranean zones and such temperatures will cause premature setting of the cementing composition. Thus, additives which extend or retard the setting time of the cement slurry are well known in the art so that there is adequate pumping time to move the aqueous cement slurry to the desired location. Additionally, dispersing agents are employed for promoting the formation and stabilization of the cement slurry. Typically, other additives such as defoaming agents, friction reducing agents and other conventional additives will be added to the cement composition.

Modified lignosulfonates derived from spent sulfite liquor obtained from the pulping of woods are known to be effective additives, both as a retardant or a dispersant, for obtaining the desired properties in cementing compositions. However, previously known dispersing agents made from modified lignosulfonates, called "thinners" since they function to reduce the effective viscosity of the cementing composition under drilling conditions, frequently also cause an increase in the retardation or setting time of the cement slurry. Therefore, it is desirable to provide a modified lignosulfonate for use as an oil well drilling cement additive that functions to "thin" cement slurries without significantly retarding the cement set time.

SUMMARY OF THE INVENTION

A dispersant for oil well drilling cement comprising an azo lignosulfonate formed from a diazonium salt and a lignosulfonate having the formula

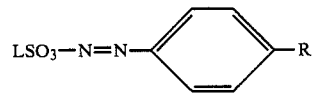

wherein R is selected from the group consisting of a carboxylic (—COOH) group or a sulfonic (—SO$_3$H) group. When used as an additive in an oil well cementing composition, the dispersant functions to reduce the aqueous cement slurry viscosity or "thin" the cement composition to make the cement slurry pumpable to the desired location without significantly retarding the set time of the cement slurry.

The lignosulfonate may be obtained from hardwood or softwood, and the diazonium salt may be obtained from sulfanilic acid or para-aminobenzoic acid.

The azo structure formed by the coupling of the lignosulfonate with the diazonium salt functions to mask the known retardation effect of the phenolic group in the lignosulfonate molecule. In order to accomplish this, the azo group is normally attached at an ortho position in reference to the phenolic hydroxyl group of the lignosulfonate molecule. As a result, the azo lignosulfonate compound of the present invention provides an oil well drilling cement additive that thins the cement slurry without significantly retarding cement set time.

DESCRIPTION OF THE PREFERRED EMBODIMENT

A dispersant for oil well drilling cement is provided by an azo lignosulfonate formed from a diazonium salt and a lignosulfonate having the formula

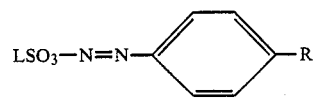

wherein R is selected from the group consisting of a carboxylic (—COOH) group or a sulfonic (—SO$_3$H) group. The dispersant provides excellent cement dispersant effectiveness with low cement set time retardation.

Lignosulfonates exist in large amounts in waste or spent sulfite liquor. Spent sulfite liquor is that portion of the wood solubilized in the acid sulfite pulping of plant materials, preferably hardwood and/or softwoods. The plant material is cooked at elevated temperatures at a pH of less than pH 7 in a solution of MHSO$_3$ where M is the cation which can include NH$_4^+$, Na$^+$, Ca$^{++}$, Mg$^{++}$, Li$^+$ and K$^+$. Spent sulfite liquors are comprised mainly of M-lignosulfonates, about 40% to about 70%; reducing sugars, about 5% to about 30%, and oligosaccharides from about 2% to about 20%.

The well known process is commonly used in making cellulose pulp for the manufacture of paper products and/or rayon. Most of the cellulose is not dissolved in the pulping process. The solubilized portion of the wood, i.e. the spent sulfite liquor, contains a substantial portion of the starting wood, 20 to 70% and usually 40 to 60%. Because of pulp washing, the spent sulfite liquor solids may range from about 5% to about 20%. Such a solution can be used in the present invention as well as concentrated solutions at about 40% solids to about 65% solids or dried spent sulfite liquor at about 90% to about 100% solids.

As used herein, the term "Kraft lignin" has its normal connotation, and refers to the substance which is typically recovered from alkaline pulping black liquors, such as are produced in the Kraft, soda and other well known alkaline pulping operations. The term "sulfonated lignin", as used in the specification, refers to the product which is obtained by the introduction of sulfonic acid groups into the Kraft lignin molecule, as may be accomplished by reaction of the Kraft lignin with sulfite or bisulfite compounds, so that Kraft lignin is rendered soluble in water. As used herein, the term "sulfite lignin" refers to the reaction product of lignin which is inherently obtained during the sulfite pulping of wood, and is a principle constituent of spent sulfite liquor. The term "lignosulfonate" (LSO$_3$) encompasses not only the sulfite lignin, but also the sulfonated lignin herein above described. Any type of lignosulfonate i.e., crude or pure as well as sulfonated, de-sulfonated, or re-sulfonated lignosulfonates may initially be employed, and the lignosulfonate may be obtained from softwood and/or hardwood. For example, calcium lignosulfonates, sodium lignosulfonates, ammonium lignosulfonates, magnesium lignosulfonates, potassium lignosulfonates, lithium lignosulfonates, modified lignosulfonates, and mixtures or blends thereof may all be initially utilized herein. Lignosulfonates are available from numerous sources, in either aqueous solution or dried powder forms. For example, Reed Lignin, Inc. sells lignosulfonates under the trade designation "Lignosol" which is a softwood sodium lignosulfonate, "Maracell" which is a de-sulfonated hardwood sodium lignosulfonate, and "Marasperse CBO" which is a de-sulfonated re-sulfonated sodium lignosulfonate which are all appropriate for use in the present invention.

The diazonium salts useful in the preparation of the dispersant are preferably made from sulfanilic acid (para-aminobenzene sulfonic acid) or paraaminobenzoic acid. Other acid sources are amino aromatic acids or diacids, as for example, paraaminobenzene disulfonic acid or para-aminobenzene dicarboxylic acid. The preparation of the diazonium salt will hereinafter be described. Preferably, the diazonium salt is the chlorine salt due to the ready availability and inexpensive cost of hydrogen chloride acid for use in the preparation of the salt. However, other salts may also be employed as an intermediate to be coupled with the lignosulfonate in forming the dispersant of the present invention as for example the bromide, cyanide or iodide salts.

The hydraulic cement composition of the present invention is typically used in the form of an aqueous slurry of hydraulic cement with a concentration of the dispersant of the present invention mixed in the aqueous slurry for promoting the formation and stabilization of the slurry. The hydraulic cement material is typically a Portland cement which is set by the water slurry in the absence of air which is excluded by placement of the cement material in the subterranean zone to be sealed. Sufficient water is typically added to the Portland cement to form the slurry and make the composition pumpable. The dispersant of the present invention is preferably present in the aqueous hydraulic cement slurry and a concentration up to about 2%, and preferably up to 1%, by weight based on the dry cement. Other types of cements such as Pozzolana cement, high alumina cement or high gel (high clay content) cement may be used with the dispersant. It is to be understood that typically other additives such as defoaming agents, friction reducing additives, retarding agents and other conventional additives will be added to the cement composition.

In a preferred process for using the dispersant and cement composition of the present invention, the dispersant is mixed with the hydraulic cement as an aqueous slurry with the dispersant concentration up to about 2% on a dry cement white basis. Other additives as described above may also be added to the cement mixture. The cement mixture is pumped into the zone to be sealed or cemented and the cement mixture is maintained in the zone until adequate compressive strength is obtained. In this process, the dispersant concentration, which is preferably 1% on a dry cement weight basis, is calculated to control the viscosity of the cement slurry so as to decrease the aqueous cement slurry viscosity to make the slurry easily pumpable to the desired site. Due to the higher dispersant efficiency of the present dispersant without any significant increase in set time retardation, the hydraulic cementing composition of the present invention results in a reduction of the time which the typical oil drilling rig is waiting for the cement to set, so as to result in a substantial economic advantage due to the higher efficiency and predictability of the cement composition of the present invention.

Exemplary of the efficacy and advantages of the present invention are the following examples, wherein all parts and percentages are on a weight basis, unless specified otherwise.

EXAMPLE I

This example illustrates the process for making the dispersant of the present invention.

In order to prepare the diazonium salt, 12.5 grams of para-aminobenzoic acid was dissolved in 150 cc of a 2.5% solution of sodium carbonate. The mixture is stirred until the para-aminobenzoic acid is completely dissolved. Thereafter, the above solution is cooled to a temperature of about 0° centigrade. Alternately, the above solution may be formed at about 0° centigrade. In either event, while the carboxylic acid mixture is maintained at about 0° centigrade, 5.55 grams of sodium nitrite ($NaNO_2$) are added to the solution to react with the carboxylic acid, namely, para-aminobenzoic acid, to form a diazonium ion intermediate. Thereafter, while still maintaining the temperature at about 0° centigrade, 15 milliliters of concentrated hydrochloric acid (HCl) is mixed therein to precipitate the diazonium chloride salt. Preferably, two moles of hydrochloric acid (HCl) plus a slight excess are used for every mole of sodium nitrite ($NaNO_2$). This ensures that the pH of the solution is low where the reaction is particularly efficient, and also provides sufficient chlorine for production of the diazonium salt. The following reaction sequence illustrates the preparation of the diazonium salt from para-aminobenzoic acid:

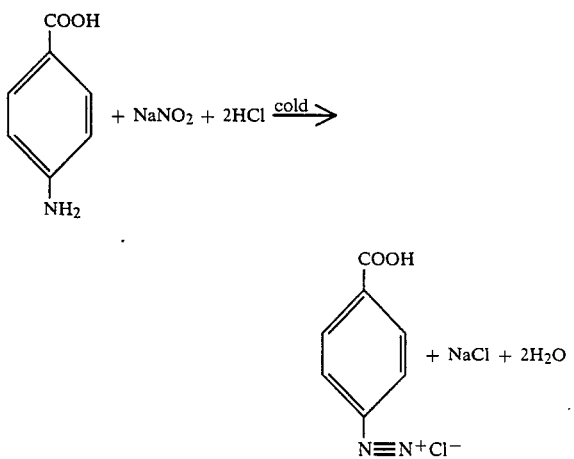

Alternately, the above procedure may be followed to produce a diazonium salt made from sulfanilic acid (para-aminobenzene sulfonic acid) starting with 15.8 grams of the sulfanilic acid. This reaction is illustrated in the following sequence:

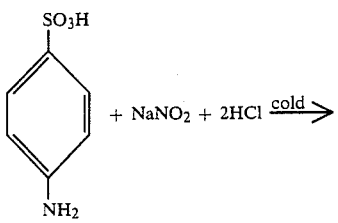

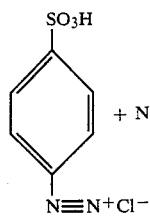

Thereafter, 20 grams of a lignosulfonate are dissolved in 60 cc of a 10% solution of sodium hydroxide (NaOH). Finally, the diazonium salt solution is then mixed with the lignosulfonate solution to form the dispersant of the present invention. The following reaction sequence illustrates the coupling of either of the above diazonium salts with a lignosulfonate:

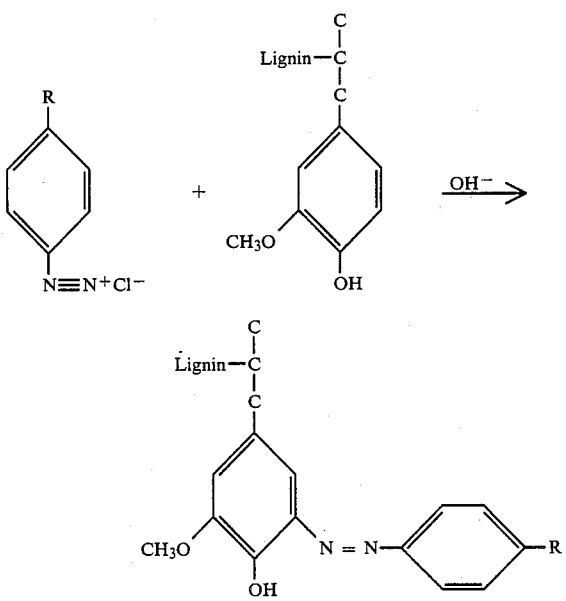

where R = —COOH or —SO$_3$H

The lignosulfonate utilized in the above preparation was that generally available under the trade designation "Marasperse CBOs-6" available from Reed Lignin, Inc. The above preparation was also performed with "Lignosol" and "Maracell" also available from Reed Lignin, Inc. with equal success.

EXAMPLE II

The following example illustrates the excellent cement dispersant effectiveness and low set time retardation obtained by utilizing a dispersant prepared in accordance with the procedures described in Example I. "Set time" is defined as a measure of the increase of heat of hydration of cement which indicates that the cement is hardening. "Yield point" is defined as the force required to move a cement slurry from a stationary location through plug flow to plastic flow, and is typically measured as pounds per 100 square feet of pipe surface.

Table I illustrates the results obtained from cement tests run on dosages from 0 to 1% on a dry cement weight basis.

TABLE I

| | CEMENT TESTS CONCENTRATION, % | | | | RAW MATERIALS | |
|---|---|---|---|---|---|---|
| SAMPLE | 0 | .5 | .75 | 1.0 | | |
| YIELD POINT | | | | | | |
| Maracell XC | — | 25 | 9 | 14 | — | — |
| 0071-67 | — | 11 | −2 | 7 | S | XE |
| 0071-70-1 | — | 95 | 100 | 160 | S | X |
| 0095-6 | — | 48 | −6 | −12 | B | X |
| 0095-6-2 | — | 65 | 2 | −2 | B | CBOs-6 |
| SET TIME, hr. | | | | | | |
| Maracell XC | 8.3 | 12 | 17 | 32 | — | — |
| 0071-67 | 8.3 | 10 | 14 | 21 | S | XE |
| 0071-70-1 | 8.3 | — | 18 | — | S | X |
| 0095-6 | 7.5 | 11 | 14 | 21 | B | X |
| 0095-6-2 | 7.8 | 10 | 11 | 14 | B | CBOs-6 |

S = Sulfanilic Acid Diazonium Salt
B = Para-Aminobenzoic Acid Diazonium Salt
XE = Maracell
X = Lignosol
CBOs-6 = Marasperse The results shown in Table I indicate that an azo lignosulfonate compound formed in accordance with the present invention by coupling a diazonium salt of para-aminobenzoic acid or sulfanilic acid with a lignosulfonate has excellent cement dispersant effectiveness as indicated by the good thinning capability shown by the relatively low numbers under the "yield point" tests without significantly increasing cement retardation time as indicated by the low numbers under the "set time" tests. It should be noted that the first set of data under both the yield point and set time tests were for a control composition without the dispersant additive of the present invention.

A dispersant for an oil well drilling cement, and a cement composition, have been described which comprises an azo lignosulfonate formed from a diazonium salt and a lignosulfonate. The azo lignosulfonate provides excellent cement dispersant effectiveness with low cement set time retardation.

Various modes of carrying out the invention are contemplated as being within the scope of the following claims particularly pointing out and distinctly claiming the subject matter which is regarded as the invention.

I claim:

1. An oil well drilling cement composition consisting essentially of an aqueous suspension of cement material and an effective dispersing amount of an azo lignosulfonate which provides low cement set time retardation formed as a reaction product from a diazonium salt and a lignosulfonate (LSO$_3$) having the formula

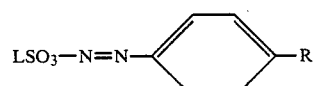

wherein R is selected from the group consisting of a carboxylic (—COOH) group or a sulfonic (—SO$_3$H) group.

2. The cement composition of claim 1 wherein said dispersing amount is less than about 1.0% by weight of dry cement material.

3. The cement composition of claim 1 wherein said lignosulfonate is obtained from softwood.

4. The cement composition of claim 1 wherein said lignosulfonate is obtained from hardwood.

5. The cement composition of claim 1 wherein said diazonium salt is obtained from sulfanilic acid.

6. The cement composition of claim 1 wherein said diazonium salt is obtained from paraaminobenzoic acid.

7. The cement composition of claim 1 wherein said lignosulfonate (LSO$_3$) is of the general formula

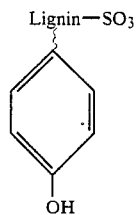

and the azo group (—N=N—) is attached at an ortho position in reference to the phenolic hydroxyl group.

* * * * *